Oct. 6, 1925. 1,556,309
A. R. BROCKSMITH
COMBINATION REAR FENDER BRACE AND BUMPER
Filed Aug. 22. 1923
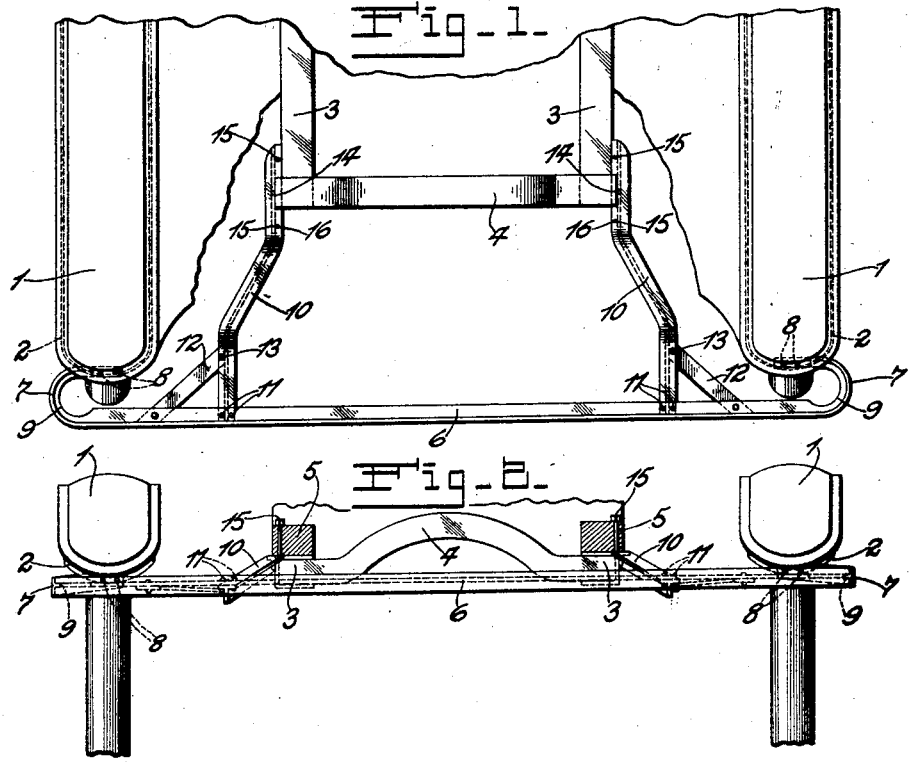
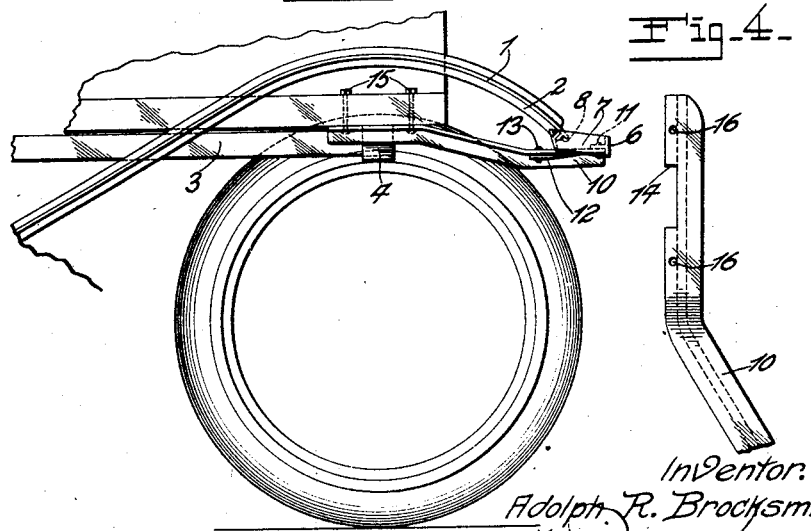
Inventor:
Adolph R. Brocksmith,
by Rippey Kingsland
His Attorneys.

Patented Oct. 6, 1925.

1,556,309

UNITED STATES PATENT OFFICE.

ADOLPH R. BROCKSMITH, OF ST. LOUIS, MISSOURI.

COMBINATION REAR FENDER BRACE AND BUMPER.

Application filed August 22, 1923. Serial No. 658,741.

*To all whom it may concern:*

Be it known that I, ADOLPH R. BROCKSMITH, a citizen of the United States, residing at St. Louis, Missouri, have invented a new and useful Combination Rear Fender Brace and Bumper, of which the following is a specification.

This invention relates to improvements in combination rear fender brace and bumper, and consists in the novel construction hereinafter disclosed.

An object of the invention is to provide a rigid frame structure adapted to constitute a bumper for the rear end of a motor vehicle and a support for the rear fenders of the vehicle, designed in such a way that it may be economically manufactured and readily applied to the vehicle structure.

Additional advantages of the invention will be apparent from the following detailed description thereof in which the invention is illustrated as applied to the vehicle, and in which—

Fig. 1 is a plan view of parts of the rear of the vehicle structure showing the device applied thereto.

Fig. 2 is an end elevation.

Fig. 3 is a side elevation.

Fig. 4 is a detailed view of one of the supporting arms.

The structure is particularly designed for application to the well known Ford motor vehicles equipped with rear fenders 1 having flanges 2 at their ends extending downwardly from the body of the fenders and constituting fender stiffeners. The frame of the chassis of the vehicle includes side members 3 and a rigid cross member 4. The body of the machine is set upon the frame and the sills 5 of the body are bolted in position on the side members. It is with this structure that the present invention is designed to be associated.

The structure of the invention includes a transverse bar 6 preferably T-shaped in cross section and having its ends rounded to form curved sections 7, the free ends of which are rigidly connected with the flanges 2 of the fenders by suitable connections 8.

In order to provide for conveniently forming the curved ends of the bar 6 it will be noted that the flange of the T-bar is cut away at 9 within the arc of the curved section 7. The bar 6 is perforated and connected to the fenders so that the fenders will be rigidly transversely braced when the bar is connected thereto. Arms 10 also formed preferably from T-iron are rigidly connected at one end of the web of the bar 6 by connections 11. Supporting struts 12 extend from the arms 10 to the bar 6, being rigidly connected with the bar and the arms respectively by connecting devices 13.

The wide web of the T-irons constituting the arms is placed upwardly and is notched out at 14 so that it fits over the ends of the cross member 4 of the chassis, thereby bracing the arms against longitudinal movement in respect of the frame of the vehicle. The portions of the arms 10 adjacent to the notches are arranged to lie against the under face of the sill 5 of the vehicle and bolts 15 pass through the sill of the vehicle and through openings 16 in the web of the arm. In this manner the rearward ends of the arms are rigidly connected with the sill of the vehicle and are held against movement by the notches fitting over the ends of the cross member of the chassis, as explained.

This structure provides a rigid durable frame preventing lateral and vertical vibration of the fenders and at the same time constituting a protective bumper structure to protect the rear end of the vehicle. The structure is so designed that it will have sufficient strength to resist substantial impact against the same and is so arranged that it may be readily connected with the conventional vehicle structure.

I am aware that the invention may be modified in certain particulars without departing from the spirit and scope thereof. I do not limit myself to unessential details, but what I claim and desire to secure by Letters Patent is:—

1. In a motor vehicle equipped with a pair of rear fenders and a chassis frame having side members and a cross member, the combination of a transverse bar having curved ends arranged to be rigidly connected with the fenders, arms extending inwardly from said bar, said arms being provided with notches engaging the ends of the cross member, and connecting devices for securing said ends to the vehicle.

2. In a motor vehicle including a pair of rear fenders, a chassis having side members, a cross member at the rear and a body sill lying over the side members of the vehicle, the combination of a transverse bar having its ends attached to said fenders, arms extending inwardly from said bar and connected therewith, said arms being provided with notches engaging the ends of the cross member of the chassis of the vehicle, bolts extending through the sill of the body of the vehicle and through said arms for connecting the ends thereof with the vehicle, and strut members extending from the arms to the bar adjacent to the point of connection between the arms and said bar.

3. In a motor vehicle equipped with a pair of rear fenders and a chassis frame having side members and a cross member, the combination of a transverse bar T-shaped in cross section having curved ends arranged to be rigidly connected with the fenders, arms T-shaped in cross section extending inwardly from said bar, said arms being provided with notches engaging the ends of the cross member, and connecting devices for securing said ends to the vehicle.

4. In a motor vehicle including a chassis having side members and a pair of rear fenders having depending flanges, the combination of a rigid frame including a transverse bar having curved ends, connections between said curved ends and the flanges of the fenders, inwardly extending arms for supporting said bar, and detachable connecting devices for rigidly securing the inner ends of said arms with the vehicle.

5. In a motor vehicle including a chassis having side members and a pair of rear fenders having depending flanges, the combination of a rigid frame including a transverse bar having curved ends, connections between said curved ends and the flanges of the fenders, inwardly extending arms for supporting said bar, and detachable connecting devices for rigidly securing the inner ends of said arms with the vehicle, said connecting devices including bolts passing through the sill of the body.

6. In a motor vehicle equipped with a pair of rear fenders, a chassis frame having side members and a cross member, the combination of a transverse bar having its ends rigidly connected with the fenders, and arms having their rear ends attached to said bar between the fenders and having their forward ends rigidly attached to the frame of the vehicle in front of said cross member.

7. In a motor vehicle equipped with a pair of rear fenders, a chassis frame having side members and a cross member, the combination of a transverse bar having its ends rigidly connected with the fenders, and arms having their rear ends attached to said bar between the fenders and having their forward ends rigidly attached to the frame of the vehicle in front of said cross member and provided with notches receiving the ends of said cross member.

8. In combination with the body and rear fenders of an automobile, a pair of supporting members secured to said body and issuing rearwardly therefrom, said supporting members projecting outwardly beyond the ends of said rear fenders, a bumper secured to said supporting members and extending beyond said fenders, inwardly turned ends formed on said bumper passing behind said fenders, and means for rigidly securing said bumper ends to said fenders.

9. In combination with the body and fenders of a vehicle a bumper having a body member, U-shaped ends connected therewith, said ends being adapted to extend beneath said fender, means for securing the ends of said bumper to said fender, and means for attaching said bumper to said body.

10. A combination fender brace and bumper in combination with an automobile body having a pair of fenders, comprising combined supporting and connecting members fixed to the automobile body and extending rearwardly therefrom, a bumper secured to the free ends of said members and having its ends projected beyond said members and in the rear of said fenders, and means for connecting said combination fender brace and bumper at two points to the pair of fenders of the automobile for holding the pair of fenders against movement relative to each other and relative to the automobile body independently of each other.

11. In a motor vehicle having a chassis frame and a pair of rear fenders, the combination of a transverse bar which is angular in cross section having one of its angular portions extending toward the chassis frame and another angular portion approximately vertical and having its ends rigidly connected with the fenders, arms having their rear ends attached to said angular portion of said bar that extends toward said chassis frame and having their forward ends rigidly attached to the chassis frame, and braces having their forward ends attached to said arms and their rear ends attached to one of the angular portions of said bar between said arms and the ends of said bar.

ADOLPH R. BROCKSMITH.